United States Patent [19]

Harry

[11] 4,441,878
[45] Apr. 10, 1984

[54] BOTTLE EJECTOR
[75] Inventor: Ieuan L. Harry, Nashua, N.H.
[73] Assignee: The Continental Group, Inc., Stamford, Conn.
[21] Appl. No.: 315,844
[22] Filed: Oct. 28, 1981
[51] Int. Cl.³ .................. B29C 17/07; B65G 47/36
[52] U.S. Cl. .................................... 425/534; 198/472; 198/484; 198/648; 198/656; 425/537; 425/538; 425/436 R
[58] Field of Search ............... 425/526, 534, 537, 538, 425/436 R, 436 RM; 264/535, 334; 198/472, 484, 648, 656

[56] References Cited
U.S. PATENT DOCUMENTS

| | | | |
|---|---|---|---|
| 3,339,230 | 9/1967 | Farrell | 425/526 |
| 3,415,915 | 12/1968 | Lecluyse et al. | 425/526 X |
| 3,479,690 | 11/1969 | Hagen | 425/538 X |
| 3,982,872 | 9/1976 | Kauffman et al. | 425/526 X |
| 4,185,812 | 1/1980 | Hall | 198/648 X |
| 4,313,905 | 2/1982 | Hafele | 264/535 X |
| 4,330,256 | 5/1982 | Reichenbach et al. | 425/436 R X |
| 4,362,498 | 12/1982 | Harry et al. | 264/535 X |
| 4,365,950 | 12/1982 | Harry et al. | 425/534 |
| 4,382,760 | 5/1983 | Watt et al. | 264/535 X |

Primary Examiner—Jan H. Silbaugh
Attorney, Agent, or Firm—Charles E. Brown

[57] ABSTRACT

This relates to an unloading mechanism for unloading blow molded articles from collets carried by a pallet. At an unloading station there is provided a plurality of vertically disposed, guided plungers or ejectors which are carried by a common support and which are spaced along the path of a pallet in accordance with the spacing of collets caried by the pallet. A single actuator carries the support for the movement of the support and the plungers in unison, whereby all blow molded articles carried by collets of a pallet are simultaneously unloaded or discharged. This abstract forms no part of the specification of this application and is not to be construed as limiting the claims of the application.

20 Claims, 3 Drawing Figures

BOTTLE EJECTOR

This invention relates in general to new and useful improvements in machinery for automatically forming bottles by a blow molding operation, and more particularly to an apparatus for ejecting blow molded bottles.

The machine of which this invention is a part utilizes pallets each having a plurality of collets which carry preforms. The pallets deliver the preforms to a like plurality of blow mold cavities, and all of the preforms are simultaneously blow molded into bottles or like tubular articles. After the bottles or the like are blow molded, the pallet carrying the bottles moves out of the mold area for discharging the bottles and again loading with preforms.

This invention relates to a simple ejector which operates at an ejection station or unloading station simultaneously to eject all blown articles from the collets of a pallet.

With the above and other objects in view that will hereinafter appear, the nature of the invention will be more clearly understood by reference to the following detailed description, the appended claims, and the several views illustrated in the accompanying drawings.

IN THE DRAWINGS

Figure 1:
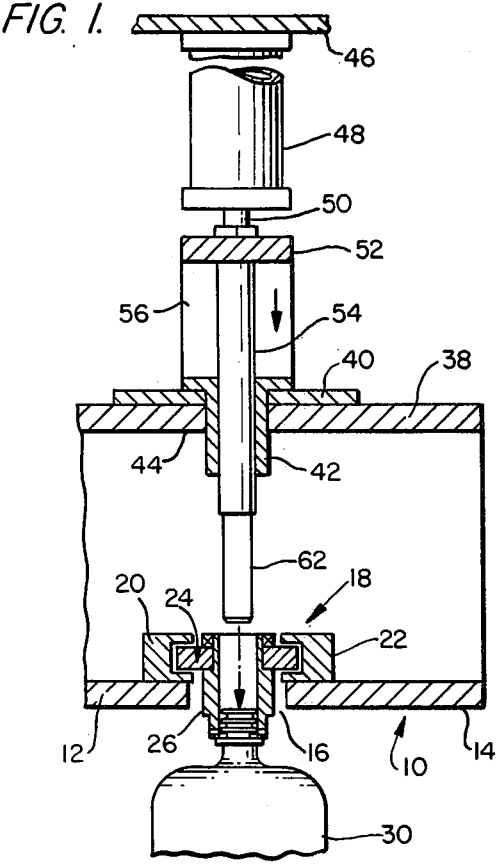
FIG. 1 is a transverse sectional view through a blow molding machine, and shows a pallet carrying bottles at an unloading station and aligned with an unloader or ejector preparatory to the ejection of articles from the pallet collets.
Figure 2:
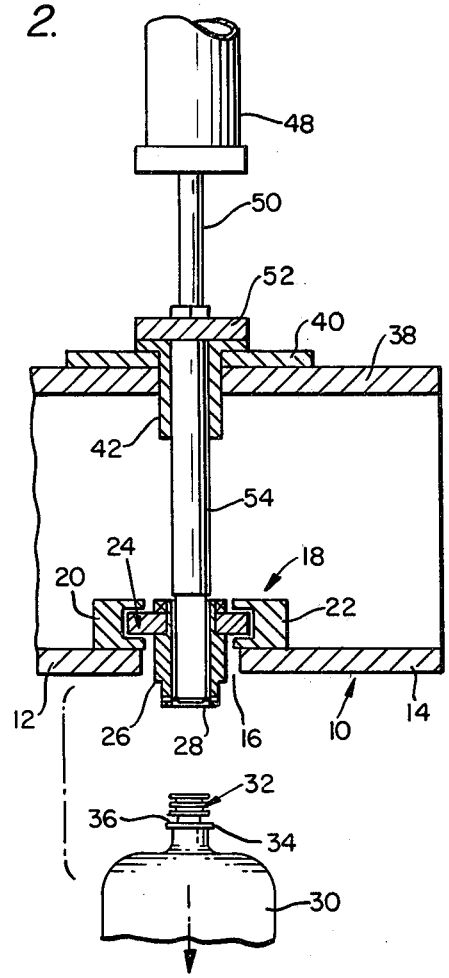
FIG. 2 is a transverse sectional view similar to FIG. 1, and shows the ejector having ejected the blown articles from the pallet.

Referring now to the drawings in detail, it will be seen that there is illustrated in FIGS. 1 and 2 a frame structure 10 of a blow molding machine. The frame structure 10 includes lower frame members 12, 14 which are transversely spaced so as to define a slot 16 therebetween. The frame members 12, 14 carry a track assembly 18 which is aligned with the slot 16. The track assembly 18 includes a generally channel shaped track member 20 mounted on the frame member 12 at the edge of the slot 16. A similar track member 22 is mounted on the frame member 14 in opposition to the track member 20 and also along the edge of the slot 16.

The blow molding machine 10 is provided with a plurality of pallets 24 which move along the track assembly 18 and are supported within the track members 20, 22 by suitable support and guide wheels. The pallet 24 is in the form of a flat bar and has rotatably journalled therein a plurality of collets 26 which extend through the pallet 24. Each collet 26 is provided at the lower portion thereof with spring loaded detent members 28 which are cooperable with a neck portion of a preform resiliently to retain such preform in depending relation for transport into a blow molding unit (not shown). Each such preform is blow molded into a hollow article such as a bottle, a typical bottle 30 being illustrated. The bottle 30 is provided with a neck finish 32 which is preferably in the form of threads for receiving a threaded closure. The neck finish 32 also includes a reference and support flange 34 above which there is an annular groove or recess 36 with which the spring loaded detents 28 cooperate to hold first the preform and then the resultant blow molded article 30 within each collet 26.

The pallets 24 carrying the blow molded articles exit from the mold unit and, in turn, each such pallet is momentarily stationarily positioned at an unloading or article ejector station, as is illustrated in FIGS. 1 and 2.

At the unloader station the frame 10 includes a frame member 38 which overlies the frame members 12, 14. The frame member 38 carries a mounting plate 40 which, in turn, carries a plurality of guide sleeves 42 which extend through suitable openings 44 in the frame member 38.

At the unloading station the frame 10 includes a further and upper frame member 46 which overlies the frame member 38 and which carries in depending relation an extensible fluid motor 48 of the double acting type. The extensible fluid motor, in turn, has a piston rod 50 which carries a horizontal bar or support member 52 from which a plurality of plungers or ejectors 54 depend. The spacing of the plungers or ejectors 54 is in accordance with the spacing of the collets 26 and the plungers extend through and are guided by the guide sleeves 42.

Figure 3:
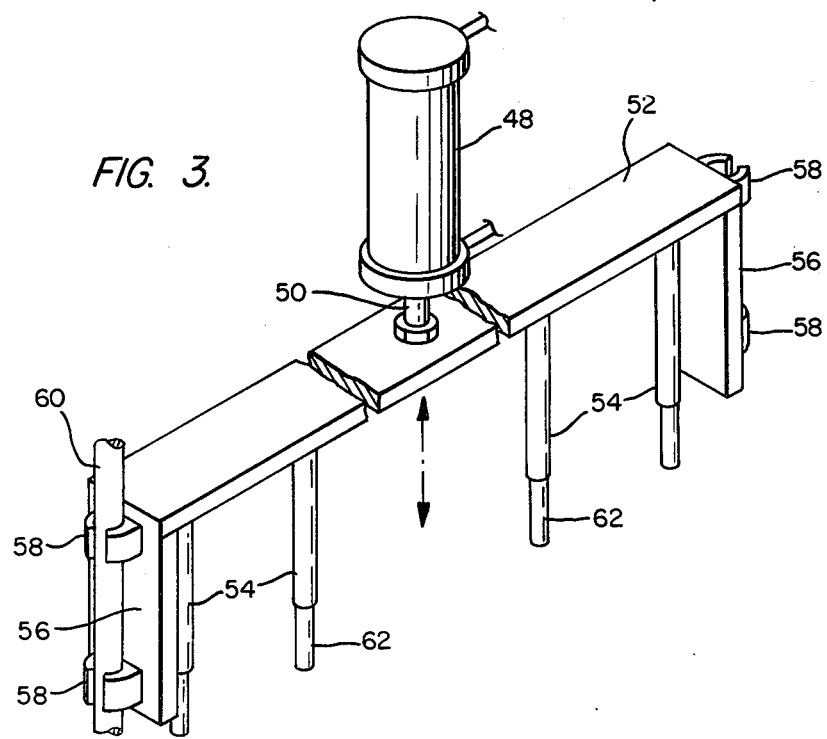
FIG. 3 is a perspective view with parts broken away of the ejector or unloader device.

As is best shown in FIG. 3, the bar or support 52 carries at its opposite ends vertical guide supports 56 which have mounted thereon in vertically spaced relation guide or follower members 58. The frame 10 also includes vertical rails 60 on which the guides 58 are mounted for vertical sliding movement. In this manner the path of vertical movement of the support or bar 52 is controlled and assured.

With reference to FIG. 2, it will be seen that after a pallet 24 is aligned with the plungers or ejectors 54, the extensible fluid motor 48 is actuated to move the bar or support 52 downwardly with the result that the plungers 54 move downwardly through the guide sleeves 42 and into and substantially through the collets 26. Each plunger or ejector 54 has a lower end portion 62 of a reduced diameter and of a diameter freely to be received within the associated collet 26 for engaging the upper end of the neck finish 32. It is to be understood that the stroke of the ejectors 54 is such as to force the neck finish 32 of each bottle 30 free of the retaining spring loaded detents 28.

A suitable chute or carryaway conveyor (not shown) will be positioned at the unloading station to receive the discharged bottles or like blow molded articles.

Although only a preferred embodiment of the invention has been specifically illustrated and described herein, it is to be understood that minor variations may be made in the unloading mechanism without departing from the spirit and scope of the invention as defined by the appended claims.

We claim:

1. In a machine of the type wherein plural blow molded articles are delivered by a pallet having a plurality of collets each carrying a blow molded article, a blow molded article ejector, said machine comprising a track for receiving a pallet and determining the position of such pallet and the collets thereof; and said blow molded article ejector comprising a guide device overlying said track, a plurality of ejector plungers carried by said guide device and spaced longitudinally of said track in accordance with the spacing of collets wherein each ejector plunger is aligned with a collet of an underlying pallet, and means for moving said ejector plungers in unison to enter into aligned collets and engage and eject blow molded articles carried by the collets from the collets.

2. Apparatus in accordance with claim 1 wherein said collets are provided with resilient detents releasably holding top portions of blow molded articles in said collets, and said means for moving said ejector plungers move said ejector plungers with sufficient force to overcome said resilient detents.

3. Apparatus according to claim 1 wherein said guide device includes a common support for said ejector plungers, and there are guide means mounting said common support for guided movement toward and away from said track.

4. Apparatus according to claim 3 wherein said guide device also includes guide bores fixed above said track and having guidedly received therethrough said ejector plungers.

5. Apparatus according to claim 4 wherein said means for moving said ejector plungers includes an extensible fluid motor connected to said common support.

6. Apparatus according to claim 3 wherein said means for moving said ejector plungers includes an extensible fluid motor connected to said common support.

7. Apparatus according to claim 1 wherein said guide device includes guide bores fixed above said track and having guidedly received therethrough said ejector plungers.

8. In a blow molding machine of the type wherein plural preforms are delivered to plural blow molds simultaneously and blow molded articles are delivered by a pallet having a plurality of collets for receiving preforms with each collet of a pallet coming from said blow molds carrying a blow molded article, a blow molded article ejector, said blow molding machine comprising a track for receiving a pallet and determining the position of such pallet and the collets thereof; and said blow molded article ejector comprising a guide device overlying said track, a plurality of ejector plungers carried by said guide device and spaced longitudinally of said track in accordance with the spacing of collets wherein each ejector plunger is aligned with a collet of an underlying pallet, and means for moving said ejector plungers in unison to enter into aligned collets and engage and eject blow molded articles carried by the collets from the collets.

9. Apparatus in accordance with claim 8 wherein said collets are provided with resilient detents releasably holding top portions of blow molded articles in said collets, and said means for moving said ejector plungers move said ejector plungers with sufficient force to overcome said resilient detents.

10. Apparatus according to claim 8 wherein said guide device includes a common support for said ejector plungers, and there are guide means mounting said common support for guided movement toward and away from said track.

11. Apparatus according to claim 10 wherein said guide device also includes guide bores fixed above said track and having guidedly received therethrough said ejector plungers.

12. Apparatus according to claim 11 wherein said means for moving said ejector plungers includes an extensible fluid motor connected to said common support.

13. Apparatus according to claim 10 wherein said means for moving said ejector plungers includes an extensible fluid motor connected to said common support.

14. Apparatus according to claim 8 wherein said guide device includes guide bores fixed above said track and having guidedly received therethrough said ejector plungers.

15. In a blow molding machine of the type wherein plural blow molded articles are delivered by a pallet having a plurality of collets each carrying a blow molded article, a blow molded article ejector, said machine comprising a track for receiving a pallet and determining the position of such pallet and the collets thereof; and said blow molded article ejector comprising a guide device overlying said track, a plurality of ejector plungers carried by said guide device and spaced longitudinally of said track in accordance with the spacing of collets wherein each ejector plunger is aligned with a collet of an underlying pallet, and means for moving said ejector plungers in unison to enter into aligned collets and engage and eject blow molded articles carried by the collets from said collets.

16. Apparatus in accordance with claim 15 wherein said collets are provided with resilient detents releasably holding top portions of blow molded articles in said collets, and said means for moving said ejector plungers move said ejector plungers with sufficient force to overcome said resilient detents.

17. Apparatus according to claim 15 wherein said guide device includes a common support for said ejector plungers, and there are guide means mounting said common support for guided movement toward and away from said track.

18. Apparatus according to claim 17 wherein said guide device also includes guide bores fixed above said track and having guidedly received therethrough said ejector plungers.

19. Apparatus according to claim 18 wherein said means for moving said ejector plungers includes an extensible fluid motor connected to said common support.

20. Apparatus according to claim 17 wherein said means for moving said ejector plungers includes an extensible fluid motor connected to said common support.

* * * * *